United States Patent Office 3,165,441
Patented Jan. 12, 1965

3,165,441
METHYLPHOSPHONOTHIOATE INSECTICIDE
George F. Ludvik and John P. Chupp, Kirkwood, and Peter E. Newallis, Crestwood, Mo., assignors to Monsanto Company, a corporation of Delaware
No Drawing. Filed Mar. 1, 1961, Ser. No. 92,446
4 Claims. (Cl. 167—30)

This invention relates to O-(n-propyl) O-(4-nitrophenyl) methylphosphonothioate and to insecticidal compositions containing same as an active ingredient.

The methylphosphonothioate of this invention can be represented by the formula

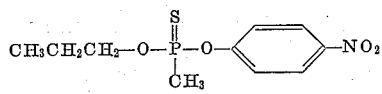

and as illustrative of its preparation is the following:

*Example I*

To a suitable reaction vessel equipped with a thermometer, agitator and reflux condenser is added 88 parts by weight of benzene, 6.96 parts by weight of 4-nitrophenol, 6.1 parts by weight of triethylamine, and 7.6 parts by weight of O-(n-propyl) methylphosphonochloridothionate. During agitation the mass is heated to the reflux temperature and then refluxed for 5 hours. The reaction mass is then cooled to room temperature and then quenched with water. The organic layer is then separated and washed first with 3% aqueous sodium carbonate and then with water. The so-washed organic solution is then stripped of volatiles under vacuum. The oily residue (11.5 parts by weight) is O-(n-propyl) O-(4-nitrophenyl) methylphosphonothioate. This oil was distilled and fraction collected at 118–121° C./0.003 mm. gave a $N_D^{23}$ of 1.5545. *Analysis.*—Theory: 11.3% P, 11.6% S, 5.1% N. Found: 11.1% P, 11.3% S, 4.9% N.

The methylphosphonothioate of Example I, i.e., O-(n-propyl) O-(4-nitrophenyl) methylphosphonothioate, which is the compound of this invention, is surprisingly characterized in comparison to its known homologues by a considerably higher order of insecticidal activity against a variety of insect life, and, on the other hand O-(n-propyl) O-(4-nitrophenyl) methylphosphonothioate displays substantially less toxicity to warm-blooded animals than its known homologues.

The methylphosphonothioate of this invention is useful as a contact insecticide and systemic insecticide against a wide variety of insects, for example against the small homopterous insects of the family Aphidae.

The methylphosphonothioate of this invention is useful in combatting Curculionidae, e.g., plum curculio, boll weevil and other members of the family of snout beetles which are extremely injurious to fruits and crops.

The methylphosphonothioate of this invention is also useful in combatting Aëdes, e.g., *Aëdes aegypti* and other members of the family Culicidae which are annoying to man.

The methylphosphonothioate of this invention is particularly outstanding in combatting Prodenia, e.g., cutworms, armyworms, etc. and other members of the family Phalaenidae, whose larvae are extremely destructive to crops.

As illustrative of the activity of the methylphosphonothioate of this invention is the following:

A 1% by weight concentrate of O-(n-propyl) O-(4-nitrophenyl) methylphosphonothioate is prepared by dissolving the chemical in 10 ml. of acetone. A 0.25 cc. tuberculin, B-D Yale syringe is filled with the concentrate and placed in a microinjection apparatus. The injector lever is pressed several times to make certain that no air bubbles are trapped in the needle and the needle is wiped with filter paper to remove any excess solution. The injector lever is pressed once to deliver one microliter which is applied directly to the ventral side of the abdomen of each of 9 adult plum curculio, *Conotrachelus nenuphar*. After application each insect is released within observation dishes and held for 24 hours at room temperature and mortality observations made at the end of that time. This procedure is repeated at decreasing concentrations and the $LD_{95}$ (i.e., the concentration giving 95% mortality) found to be 0.007 microgram per adult.

A rimless, 25 x 200 mm. culture tube is rinsed with acetone and is placed in a holding block. The tube is filled with 50 cc. of distilled water. Next 0.1 cc. of O-(n-propyl) O-(4-nitrophenyl) methylphosphonothioate is dissolved in acetone to make a 1% by weight concentrate of the test compound. 0.05 ml. of this concentrate is pipetted into the culture tube containing the distilled water. The tube is then stoppered with an acetone washed rubber stopper and shaken vigorously to facilitate complete mixing. Approximately 25 early fourth instar yellow fever mosquito larvae (*Aëdes aegypti*) are transferred to the tube with the aid of a pipette. The larvae are held in the test tube at room temperature for 24 hours at which time mortality observations are taken. This procedure is repeated at decreasing concentrations and the $LD_{95}$ (i.e., the concentration giving 95% mortality) found to be 0.012 p.p.m.

A 1% by weight concentrate is prepared by dissolving O-(n-propyl) O-(4-nitrophenyl) methylphosphonothioate in 10 ml. of acetone. A 0.25 cc. tuberculin, B-D Yale syringe is filled with this concentrate and placed in a microinjection apparatus. The injector lever is pressed several times to make certain no air bubbles are trapped in the needle and the needle is wiped with filter paper to remove excess solution. The injector lever is pressed once to deliver one microliter which is applied directly to each of 12 lima bean leaf discs 0.25 inch in diameter. Individual second instar southern armyworm larvae (*Prodenia eridania*) are placed on each disc and the disc encaged with a plastic cap. After 48 hours at room temperature mortality observations are made. This procedure is repeated at decreasing concentrations and the $LD_{95}$ (i.e., the concentration giving 95% mortality) found to be 0.055 microgram per larva.

To further illustrate the activity of O-(n-propyl) O-(4-nitrophenyl) methylphosphonothioate 0.1 part by weight thereof was dissolved in 0.5 part by volume of acetone. To this solution was added 0.5 part by volume of a non-ionic surfactant (the condensation product of one mol of octyphenol and 9.5 mols of ethylene oxide sold under the registered trademark "Triton," code designation X–100). This mixture was then added to and intimately mixed with 1000 parts by volume of water. Against the housefly, pea aphid, mites (*Tetranychus atlanticus*), and the German cockroach this aqueous emulsion, which contains 0.01 part by weight of active ingredient per 100 parts by volume of the emulsion, exhibited 100% kills in all instances on contact with the respective insects in a standard contact insecticide evaluation procedure. In a standard systemic insecticidal evaluation against the southern armyworm and the pea aphid a similarly prepared aqueous emulsion but which contained 0.05 part by weight of O-(n-propyl) O-(4-nitrophenyl) methylphosphonothioate per 100 parts by volume of the emulsion gave 100% kills respectively.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spider, mites, ticks, centipedes, and wood lice.

Although the methylphosphonothioate of this invention is useful per se in controlling a wide variety of insect pests, it is preferable that it be supplied to the pests or to the environment of the pest or pests in a dispersed form in a suitable extending agent.

In the instant specification and appended claims it is to be understood that the term "dispersed" is used in its widest possible sense. When it is said that the methylphonsphonothioate of this invention is dispersed, it means that particles of the methylphosphonothioate of this invention can be molecular in size and held in true solution in a suitable organic solvent. It means further, that the particles can be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they can be actually dissolved in the semi-solid or held in suspension in the semi-solid with the aid of suitable wetting or emulsifying agents. The term "dispersed" also means that the particles can be mixed with and distributed throughout a solid carrier providing a mixture in particulate form, e.g., pellets, granules, powders, or dusts. The term "dispersed" also includes mixtuers which are suitable for use as aerosols including solutions, suspensions or emulsions of the methylphosphonothioate of this invention in a carrier such as dichlorodifluoromethane and the like fluorochloroalkanes which boil below room temperature at atmospheric pressure.

In the instant specification and apended claims it is to be understood that the expression "extending agent" includes any and all of the substances in which the methylphosphonothioate of this invention is dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the methylphosphonothioate of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the methylphosphonothioate employed to supply the desired dosage generally will be in the range of 0.001 to 50 percent by weight. When the extending agent is a semi-solid or solid, the concentration of the methylphosphonothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powedered clay or talc) or other low-cost material available to the agriculturist at the point of use, he will have an easily prepared insecticidal spray or particulate solid. In such a concentrate composition, the methylphosphonothioate generally will be present in a concentration of 5 to 95 percent by weight, the residue being any one or more of the well known insecticidal adjuvants, such as the various surface active agents (e.g., detergents, a soap or other emulsifying or wetting agent), surface-active clays, solvents, diluents, carrier media, adhesives, spreading agents, humectants, and the like.

There are a large number of organic liquids which can be used for the preparation of solutions, suspensions or emulsions of the methylphosphonothioate of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F. at atmospheric pressure and having a flash point above about 80 F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the methylphosphonothioate of this invention is to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The methylphosphonothioate of this invention is preferably supplied to the insect pests or to the environment of the insect pests in the form of emulsions or suspension. Emulsions or suspensions are prepared by dispersing the methylphosphonothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compound of this invention in order to secure better wetting and spreading of the active ingredient in the water vehicle or carrier in which it is insoluble through lowering the surface tension of the water (see also Frear, "Chemistry of Insecticides, Fungicides and Herbicides," second edition, page 280). These surfactants include the well-known capillary-active substances which may be anion-active (or anionic), cation-active (or cationic), or non-ionizing or (non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e., the anion-active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The methylphosphonothioate of this invention can be dispersed by suitable methods (e.g., tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g., attapulgus clay. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprays.

For special purposes the methylphosphonothioate of this invention can be dispersed in a semi-solid extending agent such as petrolatum or soap (e.g., sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of the methylphosphonate of this invention with a water-soluble surfactant which lowers the surface tension of water in the weight proportions of 0.1 to 15 parts of surfactant with sufficient of the methylphosphonothioate of this invention to make 100 parts by weight. Such a concentrate is particularly adapted to be made into a spray for combatting various forms of insect pests by the addition of water thereto. As illustrative of such a concentrate is an intimate mixture of 95 parts by weight of O-(n-propyl) O-(4-nitrophenyl) methylphosphonothioate and 5 parts by weight of a water-soluble non-ionic surfactant such as the polyoxyethylene derivative of sorbitan monolaurate.

Another useful concentrate adapted to be made into a spray for combatting a variety of insect pests is a solution (preferably as concentrated as possible) of the methylphosphonothioate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of O-(n-propyl) O-(4-nitrophenyl) methylphosphonothioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivaties of the mono-higher fatty acid esters of hexitol anhydrides (e.g., sorbitan) which materials usually contain 15 to 30 moles of ethylene oxide per mole of the hexitol anhydride or the alkylphenol.

The methylphosphonothioate of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the methylphosphonothioate of this invention either per se or compositions comprising same is supplied to the insect pests or to their environment in a lethal or toxic amount. This can be done by dispersing the new insecticidal agent or insecticidal composition comprising same in, on or over an infested environment or in, on or over environment the insect pests frequent, e.g., agricultural soil or other growth media or other media infested with insect pests or attractable to the pests for habitational or sustenance or propagational purposes, in any conventional fashion which permits contact between the insect pests and the methylphosphonothioate of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g., power dusters, boom and hand sprayers, and spray dusters. Also for sub-surface application such dispersing can be carried out by simply mixing the new insecticidal agent per se or insecticidal spray or particulate solid compositions comprising same with the infested environment or with the invironment the insect pests frequent, or by employing a liquid carrier for the new insecticidal agent to accomplish sub-surface penetration and impregnation therein.

The method of providing the methylphosphonothioate of this invention comprises reacting 4-nitrophenol with O-(n-propyl) methylphosphonochloridothionate in the presence of a hydrogen halide scavenging agent or mixture of hydrogen halide scavenging agents (e.g., sodium carbonate, potassium carbonate, triethylamine, triisopropylamine, tributylamine, dimethylaniline, lutidine, 1-pipecoline, pyridine, etc.) and the like in an amount sufficient to absorb the hydrogen halide by product. Where and when desired an inert organic liquid or solvent (e.g., acetone, butanone, dioxane, benzene, toluene, xylene, etc.) can be used. While a wide range of reaction temperatures can be used provided the system is fluid (i.e., a temperature above the freezing point of the reaction system up to and including the boiling point of the system) it is preferred to employ a reaction temperature in the range of from about 10° C. to about 120° C. In general the halide reactant and the phenolic reactant will be employed in substantially equimolecular proportions. The scavenging agent can be added in an equivalent amount at the beginning of the reaction or throughout the course of the reaction.

The methods by which the methylphosphonothioate of this invention is isolated will vary slightly according to the designs of the manufacturer. Further purification by selective solvent extraction or by absorptive agents such as activated carbon or clays can be employed and alternatively such operations can precede the removal of the inert organic liquid or solvent when such is used. However, the product is generally satisfactory for insecticidal purposes without further purification.

While this invention has been described with respect to certain embodiments, it is to be understood that it is not so limited and that variations and modifications thereof obvious to those skilled in the art can be made without departing from the spirit and scope thereof.

What is claimed is:

1. An insecticidal composition comprising O-(n-propyl) O-(4-nitrophenyl) methylphosphonothioate dispersed in an extending agent selected from the group consisting of solid and semi-solid extending agents, the composition containing 0.1 to 25 percent by weight of said methylphosphonothioate.

2. An insecticidal concentrate comprising O-(n-propyl)

O-(4-nitrophenyl) methylphosphonothioate dispersed in an organic solvent therefor and having dissolved therein a minor amount of a surfactant, said concentrate forming an emulsion with water upon agitation therewith.

3. The method of controlling insects which comprises contacting the insects with a toxic amount of O-(n-propyl) O-(4-nitrophenyl) methylphosphonothioate.

4. The method for protection of plants against insect attack which comprises applying to the plant an insecticidal amount of O-(n-propyl) O-(4-nitrophenyl) methylphosphonothioate.

References Cited in the file of this patent

UNITED STATES PATENTS 2,910,402  Fairchild _____ Oct. 27, 1959

FOREIGN PATENTS 814,152  Germany _____ Sept. 20, 1951

OTHER REFERENCES

Razumov et al.: Chem. Abs. 52, 237–238 (1958).
Kabuchnik et al.: Zhur. Obschii Chem. 28 (6), 1568–73 (1958).